Aug. 8, 1950

P. GLASS ET AL 2,517,783

CONTROL CIRCUIT FOR ALTERNATELY
OPERATING ELECTRIC DEVICES

Filed Feb. 25, 1946

INVENTORS.
Paul Glass
Frank E. Prem
By Emmet A. Wagner
Atty.

INVENTORS.
Paul Glass
Frank E. Prem

INVENTORS.
Paul Glass
Frank E. Prem

Aug. 8, 1950     P. GLASS ET AL     2,517,783
CONTROL CIRCUIT FOR ALTERNATELY
OPERATING ELECTRIC DEVICES
Filed Feb. 25, 1946     4 Sheets-Sheet 4

Fig. 7

INVENTORS.
Paul Glass.
Frank E. Prem.
BY
Chritton, Schroeder, Merriam & Hofgren
Attys Patented Aug. 8, 1950

2,517,783

UNITED STATES PATENT OFFICE 2,517,783

CONTROL CIRCUIT FOR ALTERNATELY OPERATING ELECTRIC DEVICES

Paul Glass and Frank E. Prem, Chicago, Ill., assignors to Askania Regulator Company, Chicago, Ill., a corporation of Illinois Application February 25, 1946, Serial No. 650,042

24 Claims. (Cl. 171—97)

The invention relates generally to electrical control circuits and more particularly to circuits for the control of alternately operating devices.

In numerous installations there are two devices so interrelated as to necessitate the operation of one or the other of the devices at all times but with only one of the devices operating at any given time. Such alternate operation is usually in response to change in a condition sought to be regulated or maintained constant, necessitating the control to be effected through a single means responsive to the condition.

One object of the invention, therefore, is to provide a new and improved electrical control circuit designed to govern, through the agency of a single means, the alternate operation of a pair of devices.

Another object of the invention is to provide a new and improved electrical control circuit for governing a pair of alternately operating devices which is designed to assure proper operation under all conditions as to the time of call for a change in operation of the devices.

Other objects and advantages will become apparent from the following detailed description taken in connection with the accompanying drawings, in which:

Fig. 7 is a diagrammatic view illustrating still another modification of the invention.

Figure 1:
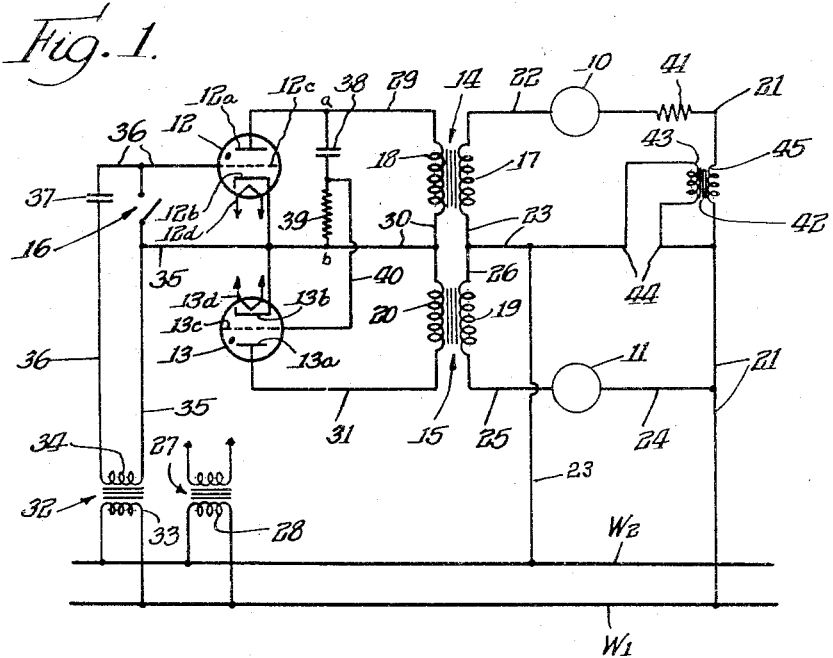
Fig. 1 is a diagrammatic view of a circuit embodying a preferred form of the invention.

This application is a continuation in part of the Paul Glass and Frank E. Prem application, Serial No. 507,006, filed October 20, 1943, now forfeited, for Electrical Control Circuit.

While the invention is susceptible of various modifications and alternative constructions, it is herein disclosed in one preferred form and several modifications. It is not intended, however, that the invention is to be limited to the specific constructions disclosed. On the contrary it is intended to cover all modifications and variations or alternative constructions falling within the spirit and scope of the invention as defined in the appended claims.

In the exemplary embodiments of the invention shown in the drawings for purposes of disclosure, 10 and 11 represent electrical devices which are to be controlled. These devices may take a variety of forms and may be either relays or the like for in turn controlling some other apparatus, they may be tubes, or they may, as represented particularly in Figs. 1 to 3, 5 and 6, be electric motors of the alternating current type. Associated with these devices is a control circuit comprising generally a pair of electric-valve tubes 12 and 13 of the thyratron type acting through a pair of reactors 14 and 15 and governed by a single means, herein shown as a make-and-break switch 16, to control the operation of the devices 10 and 11 in such manner that one or the other of the devices is operating at all times, but for no material period of time are the devices operating simultaneously. Generally speaking, switch 16 governs operation or firing of the tube 12, which in turn so varies the impedance of the reactor 14 as to bring about operation or arrest of the device 10, depending upon the circuit connections. Tube 12 also controls tube 13 to cause firing or non-firing thereof inversely to the tube 12, that is, when the tube 12 is firing the tube 13 is not firing, and when the tube 12 is not firing the tube 13 is firing. The tube 13 in turn produces such change in the impedance of the reactor 15 as to initiate or arrest operation of the device 11, such operation of the device being the inverse of the device 10, that is, operating when the device 10 is not operating and vice versa.

Turning now to a more detailed consideration of the circuit, the reactor 14 comprises a first, primary or reactor winding 17 and a second, secondary or control winding 18 having a common magnetic core. Similarly, reactor 15 comprises a first, primary or reactor winding 19 and a second, secondary or control winding 20 having a common magnetic core. The reactor windings 17 and 19 each have a normal, relatively high impedance which is materially lowered upon the flow of unidirectional current through the corresponding secondary or control windings 18 and 20, respectively. It is this characteristic of reactors that is here employed to initiate or arrest operation of the devices 10 and 11. To that end, the reactor winding 17 is connected in electrical circuit with the device 10 and a source of alternating current in such manner that the variation in impedance of the reactor initiates or arrests operation of the device 10 even though the device is permanently in circuit with the source of alternating current. Likewise, reactor winding 19 is connected in circuit with the device 11 and the source of alternating current. Herein the reactor winding 17 is connected in series circuit with the device 10, though it is conceivable that under some circumstances a parallel connection would be feasible and desirable. The circuit may, for convenience, be referred to as reactor-device circuit and comprises line wire W1, lead 21, device 10, lead 22, winding 17, and lead 23 to line wire W2. The other reactor-device circuit, likewise having a series connection, comprises line wire W1, lead 21, branch lead 24 to device 11, lead 25, winding 19, and lead 26 connected to lead 23, and thus back to line wire W2.

The tubes 12 and 13 are of the grid control type. Accordingly, the tube 12 comprises an anode or plate 12a, a cathode 12b and a grid 12c. Similarly, tube 13 comprises an anode or plate 13a, a cathode 13b and a grid 13c. The cathodes are herein shown indirectly heated through filaments 12d and 13d, respectively, energized from the same alternating current source through a heater transformer, generally designated 27, whose primary winding 28 is connected to the line wires W1 and W2. The plate voltage for the tube 12 is supplied by the winding 18, the reactor 14 serving the dual purpose of a reactor and a transformer, and to that end the plate 12a is by a lead 29 connected to one terminal of the winding 18, while the other terminal of the winding is by a lead 30 connected to the cathode 12b. The plate voltage for the tube 13 is in like manner provided by the winding 20 of the reactor 15 and to that end the plate 13a is by a lead 31 connected to one terminal of the winding 20, the other terminal being connected to the common lead 30 connected to the cathode 13b.

Means is provided to control the firing of the tube 12. This means includes the heretofore mentioned switch 16 and additionally includes means for placing a negative bias on the grid 12c in order to prevent firing of the tube at desired times. This last mentioned means comprises a transformer, generally designated 32, having a primary winding 33 connected to the line wires W1 and W2 and a secondary winding 34. One terminal of the secondary winding 34 is, through a lead 35, connected to the common or ground lead 30 and thus to the cathode 12b of tube 12. The other terminal of the winding 34 is by a lead 36 connected to the grid 12c and this lead has incorporated therein a condenser 37. Switch 16 is connected to the lead 35 and to the lead 36 intermediate the condenser 37 and the tube 12, so as to be capable of rendering the transformer 32 effective or ineffective to place a bias on the grid 12c. The transformer 32 is so connected in circuit that when the switch 16 is open a negative bias is placed on the grid 12c, particularly during that half of the cycle when the plate 12a is positive.

Control of the tube 13, as already stated, is under the tube 12 with the control being such that the tube 13 is firing when the tube 12 is not firing, and vice versa. To that end, there is connected across the anode circuit of the tube 12, that is, in parallel with the winding 18, a condenser 38 and a resistance 39 connected in series. The value of the condenser is so chosen that its reactance is small compared to the resistance value of the resistance 39, the resistance being on the order of ten times the reactance of the condenser 38.

Grid 13c of the tube 13 is by a lead 40 connected to a point intermediate the condenser 38 and the resistance 39.

Figure 4:
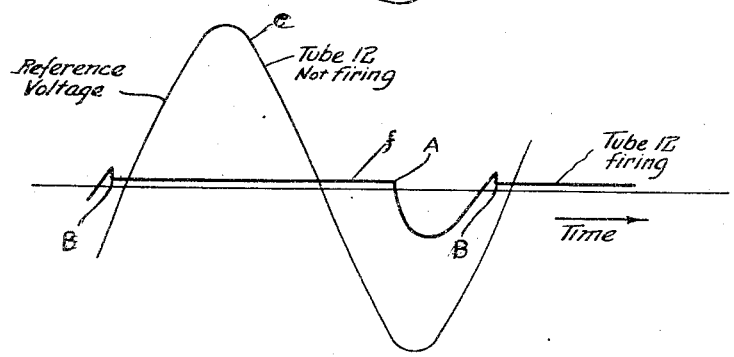
Fig. 4 is a view representing the voltages occurring in certain parts of the circuit under different conditions.

For a better and more ready understanding of the operation of the circuit so far described, and particularly of the basic novelty yet to be described, the voltage of the secondary winding 18 of the reactor 14 under different operating conditions will be briefly discussed. If it be assumed that the grid circuit of tube 12 is such as to prevent the tube from breaking down, the voltage of the secondary winding 18 (the winding being now on open circuit) is a sine wave substantially in phase opposition to the applied line voltage. This voltage is represented by the curve e in Fig. 4 and may be termed reference voltage. If now it is assumed that the switch 16 is closed so as to condition the grid circuit to permit break-down of the tube, the tube conducts current part of every cycle and the voltage of the secondary winding 18 assumes a wave form shown by curve f in Fig. 4. From this curve f it will be seen that the tube 12 stops conducting at the instant A and fires again at the instant B in every cycle of the supply voltage. The fact that the tube is conducting current well into the negative half cycle of the reference voltage is apparently due to the inductive load which is present in the plate circuit. The fact that the tube again commences firing at the instant B, while the reference voltage is still negative, is apparently due to the fact that the actual plate-cathode voltage is advanced with respect to the reference voltage, thus becoming positive and reaching the break-down value of the tube at the instant B. This phase shift of the actual plate-cathode voltage is believed accounted for by the magnetization of the reactor core produced by the unidirectional current flowing through the secondary winding 18 during firing of the tube 12, that is, the interval B to A, Fig. 4. This magnetization, and particularly the residual magnetization is believed to account for the fact that the secondary voltage during the interval A to B is much smaller than the reference voltage, although in both cases no current is flowing through the secondary winding 18.

Let it be assumed now that the circuit has attained a steady state of operation with the switch 16 closed. The grid 12c is now connected directly to its cathode 12b with the transformer 32 ineffective to apply a negative grid bias, and thus the tube will break down and fire during every cycle of the supply voltage. With such firing of the tube, a unidirectional current flows through the secondary winding 18, thereby reducing the impedance of the reactor 14 to the point where sufficient voltage is applied across the device 10 to cause operation thereof. If now it be assumed that the switch 16 opens, the grid 12c is now connected to the transformer 32 through the condenser 37. As previously stated, the transformer is so connected that its secondary voltage is in phase opposition to the reference voltage and thus, through the condenser 37, causes the grid 12c to have a negative bias during most of the cycle and particularly during the positive half of the reference voltage, thereby preventing the tube 12 from breaking down. With no unidirectional current flowing through the winding 18, the impedance of the reactor 14 remains high, accounting for most of the voltage drop in the reactor-device circuit and thereby preventing operation of the device 10.

With the switch 16 open and the tube 12 thus prevented from firing, the tube 13 fires during every cycle of the applied voltage. This occurs because the grid voltage of the tube 13 is now positive at least during that half cycle during which the plate is positive. With the reactors 14 and 15 connected in the same manner to the same source of alternating current, it will readily be apparent that the reference voltage e is also substantially the voltage of the secondary winding 20 of the reactor 15. Since tube 12 is not firing, the full voltage of the secondary winding 18 appears across the series connected condenser 38 and resistance 39, that is, across points $a$ to $b$ of the plate circuit of the tube 12. As already stated, the resistance 39 is large compared to the reactance of the condenser 38, so that almost the full voltage applied across points $a$ to $b$ appears across the resistance 39 and acts as the grid potential of tube 13. Thus the plate and the grid voltage of tube 13 are of the same phase, with the result that tube 13 breaks down and fires at the beginning of every positive half cycle. With such firing of tube 13, a unidirectional current flows through the secondary winding 20, thereby reducing the impedance of the reactor 15 to the point where sufficient voltage is applied across the device 11 to cause operation thereof.

Just as tube 13 is caused to fire when tube 12 is not firing, so also is tube 13 prevented from firing when tube 12 is firing, as already stated. The control of tube 13 by tube 12 under this condition is best understood from a reference to curve $f$ of Fig. 4. It will be seen that the voltage at the points $a, b$ of Fig. 1, just prior in time to the point B, becomes positive and increases to the break-down value of the tube 12. This short positive voltage peak produces a sharp current peak through the condenser 38 and the grid-cathode path of tube 13, resulting in the condenser 38 being charged so that the plate adjacent the lead 40 is negative. Following this brief charging period, the condenser discharges through the now broken down tube 12 and resistance 39. The time constant of this discharge path is large and hence the discharge period continues until the tube 12 stops firing, that is, until the point A on curve $f$ is reached, and thus throughout this time the potential of the grid 13c will be negative. From point A to substantially point B the voltage present at the points $a, b$ is of the reverse sign, as clearly seen from Fig. 4, sending a current through the condenser and the resistance in the direction of the previous discharge current, thus maintaining the voltage drop across the resistance 39 such that the grid 13c is maintained negative. True it is that as the voltage reaches the positive peak, represented at B, the voltage drop across the resistance 39 becomes positive for a very brief instant, but is made negative again by the discharging current of the condenser and, what is most important, is made negative prior to the time that the plate voltage of the tube 13 becomes positive. The potential of the grid 13c thus has been negative throughout the entire half cycle that the plate 13a of the tube 13 has been positive, and thus firing of the tube has been prevented. The steady state operation of the circuit with the switch 16 either open or closed has thus been described and it is believed readily understandable.

The circuit so far described, once it has reached a steady state of operation, functions perfectly to maintain one or the other of the tubes firing at all times. It was found, however, that the circuit was subject to improper operation at the time of transition from one condition to the other, that is, switch-open to switch-closed position, or vice versa, depending upon the time when the transition took place. This was particularly true upon closure of the switch 16. When the switch 16 is open tube 13 is, of course, firing. If then the switch 16 is closed during a positive half cycle of the plate voltage of tube 12, the tube will break down at the instant the switch is closed and both tubes will continue to fire during the remainder of the positive part of the cycle and even beyond, that is, until point A in Fig. 4. Both tubes will then extinguish and remain non-conducting during the part of the cycle A to B and assuming that normal conditions exist, namely, with the reactors, devices and tubes having identical characteristics, the plate voltages of both tubes will be identical and both tubes will break down again at the same moment as soon as the plate voltages have reached the break-down point. This follows because there has been no opportunity for the grid of tube 13 to become negative, which is the determining factor in preventing firing of the tube 13, as above explained. The conditions would be repeated endlessly, resulting in simultaneous operation of both tubes. If switch 16 is closed during the negative half cycle, the situation is temporarily even worse, for then the tube 13 would, for the first cycle following closure of the switch 16, break down, not merely simultaneously with tube 12, but actually in advance thereof, because of the phase shift of the plate voltage, due to unidirectional current magnetization, as will presently become more apparent. After the first cycle, the tubes would break down simultaneously as upon closure of switch 16 during the positive half cycle.

Provision is herein made for assuring proper operation of the control circuit under all conditions and regardless of the point in the cycle where the switch 16 is either closed or opened. It has been found that to obtain this assured proper operation, particularly upon closure of the switch 16, tube 12 must, upon commencement of a cycle following closure of the switch 16, break down sufficiently in advance of the tube 13 to provide an opportunity for the grid 13c of the tube 13 to become negative before the plate voltage of tube 13 reaches the break-down value.

For definiteness and accuracy in the disclosure and the claims, and for more ready understanding of the invention, attention is drawn to the fact that the tubes 12 and 13 have differing plate voltages under different conditions. As already pointed out in connection with tube 12, when the switch 16 is open so that the tube cannot fire, the secondary winding 18 of the reactor 14 is the equivalent of being on open circuit with the result that the voltage of the secondary winding 18 is a sine wave substantially in phase opposition to the applied line voltage. This voltage, represented by curve $e$ in Fig. 4 and heretofore designated and employed as a reference voltage, is, of course, under the above mentioned condition, also the plate voltage of the tube 12. To identify this plate voltage, it will hereinafter and in the claims be designated as the "non-firing plate voltage." It has also been pointed out heretofore that when the switch 16 is closed and the tube 12 conducts current during a part of every cycle, the voltage of the secondary winding 18, and hence the plate voltage of the tube 12, takes the form shown by the curve $f$ in Fig. 4. This plate voltage will hereinafter be referred to as "firing plate voltage." The terms, of course, apply to the cycle of operation as a whole as distinguished from any part thereof, that is, by way of example, the portion A to B of the curve $f$ of Fig. 4 would be referred to as the firing plate voltage even though during that period the tube 12 is not actually conducting current. Similarly, the tube 13 will have a substantially sinusoidal plate voltage when the tube is prevented from firing, and will have a voltage similar to that represented by the curve $f$ in Fig. 4 when it is firing, and these voltages will also, therefore, be referred to respectively as "non-firing plate voltage" and "firing plate voltage."

To obtain break-down of the tube 12 ahead of the tube 13, above stated as essential to proper operation upon closure of the switch 16, the plate voltage for the tube 12 must lead the plate voltage of the tube 13 by just a sufficient amount to permit the grid 13c to become negative. The plate voltages of the tube 12 will, however, vary with different conditions. Thus, if the switch 16 is closed during the negative half cycle of the reference voltage, the plate voltage of tube 12 at the commencement of the cycle following closure of the switch will, so far as phase displacement is concerned, coincide with the reference voltage because there will be no residual magnetization of the core of the reactor 14, since no unidirectional current has been flowing. In contrast, the plate voltage of tube 13 is the firing plate voltage which, as above pointed out, causes break-down of the tube in advance of the reference voltage and, in this case, might very readily cause breakdown of the tube 13 ahead of tube 12. If switch 16 is closed during the positive half cycle of the reference voltage, the tube 12 will immediately commence firing so that the plate voltage, at the beginning of the cycle following the closure of the switch 16, will be the firing plate voltage represented by the curve $f$ in Fig. 4 and above shown to cause break-down of the tube 12 at the point B in advance of the reference voltage. Thus, under these conditions, it is a question of having the firing plate voltage of tube 12 lead the firing plate voltage of tube 13 sufficiently to cause break-down of the tube 12 in advance of the tube 13.

It has been found that the way to assure breakdown of the tube 12 ahead of the tube 13 under all conditions is to have the non-firing plate voltage of tube 12 at all times be advanced relative to the non-firing plate voltage of tube 13. A slight phase displacement is sufficient, though a larger phase displacement is no less suitable. This may be accomplished with the circuit as so far described, without the inclusion of additional elements, simply by proper selection of the parts making up the different portions of the circuit. Practically, there are always slight differences in the impedances of similar units. Thus, though the motors 10 and 11, as well as the reactors 14 and 15, are supposedly identical, one of each pair will have a lower inductance to resistance ratio. If then, of the two motors and two reactors, the motor and the reactor resulting in the lower inductance to resistance ratio are placed in the circuit for the tube 12, the open circuit voltage of the secondary 18 will lead slightly the open circuit voltage of the secondary 20 and hence the non-firing plate voltage of the tube 12 will lead the non-firing plate voltage of the tube 13. As a further step in this same direction, the tube having the lower break-down voltage should be placed in the position of tube 12.

While the above way of obtaining a leading non-firing plate voltage on the tube 12 is theoretically and practically possible, it is not always expedient and it does not always provide a sufficient phase displacement between the two plate voltages to assure proper operation. Accordingly, phase shifting means independent of the characteristics of the units are herein provided. Such means may be incorporated either in the portion of the circuit associated with the tube 12, in which event it should be of an advancing nature, or it may be incorporated in that portion of the circuit associated with the tube 13, in which event it should be of a retarding nature. In the form of the invention shown in Fig. 1, this phase shifting means is incorporated in the portion of the circuit associated with the tube 12, and takes the form of a resistance 41 connected in series with the motor 10 and the primary winding 17 of the reactor 14. Such additional resistance will, of course, reduce the inductance to resistance ratio of the circuit and hence will cause the voltage of the secondary winding 18 to lead the voltage of the secondary winding 20. The resistance 41 need be of but a few ohms value and, therefore, results in a negligible voltage drop across the resistance. However, should it be desired to compensate for this drop, a boosting transformer 42 might be connected in the circuit with its primary winding 43 connected through leads 44 and leads 21 and 23 to the line wires W1 and W2, and with its secondary winding 45 connected in series with the resistance 41, motor 10, and winding 17.

Figure 2:
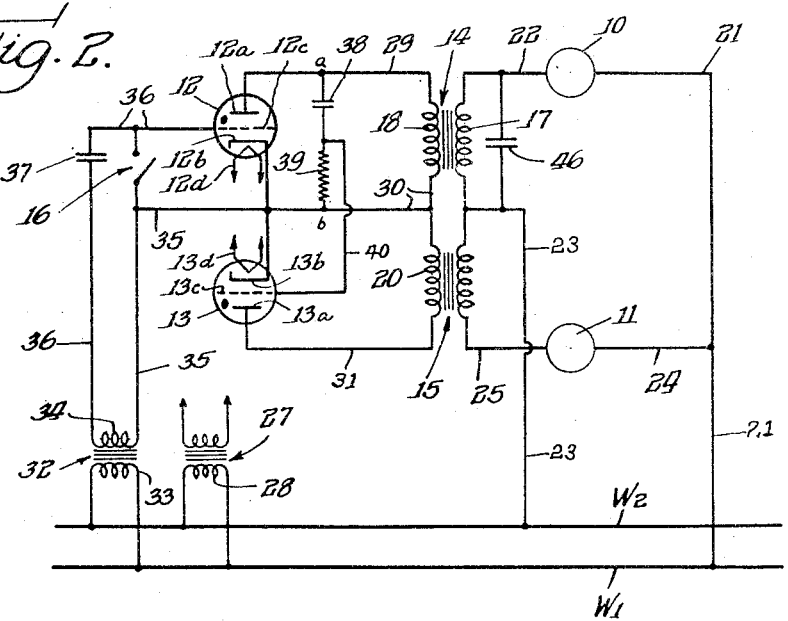
Fig. 2 is a view similar to Fig. 1 illustrating a modified form of the invention.
Figure 3:
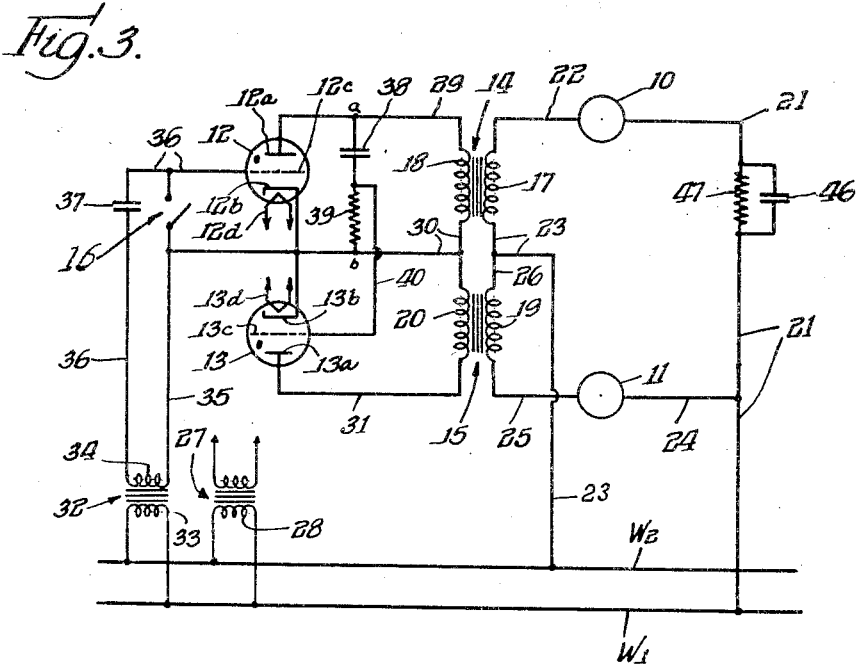
Fig. 3 is another view similar to Fig. 1 embodying still another form of the invention.

The circuit of the modified forms of the invention illustrated in Figs. 2, 3, 5 and 6 are identical with the basic or main control circuit heretofore described, and vary only in the phase shifting means. Like reference characters have, therefore, been applied, making the previous description applicable, and it is believed sufficient therefore, if merely the phase shifting means is hereinafter described. Referring first to Fig. 2, the phase shifting means again is connected in the portion of the circuit associated with the tube 12 and in this particular embodiment takes the form of a condenser 46 connected in parallel with the primary winding 17 of the reactor 14. Referring to Fig. 3, the phase shifting means therein disclosed comprises a resistance 47 and a condenser 46 connected in parallel with the resistance-condenser unit connected in series with the motor 10 and the primary winding 17 of the reactor 14.

Figure 5:
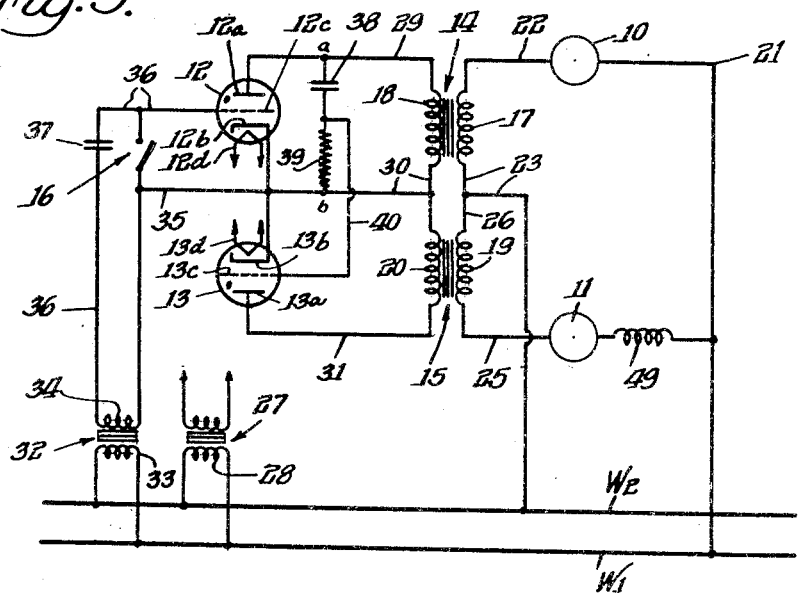
Fig. 5 is another view similar to Fig. 1 illustrating a further modification.
Figure 6:
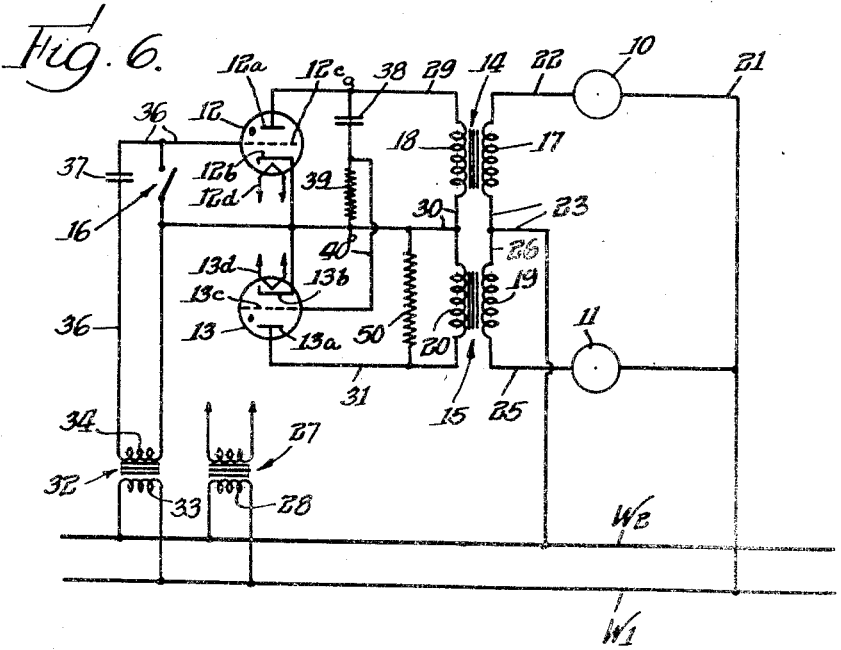
Fig. 6 is a view similar to Fig. 1 illustrating yet another modified form of the invention.

In Figs. 5 and 6, the phase shifting means are connected in the portion of the circuit associated with the tube 13 and thus are of such a nature as to produce a lagging effect on the voltage of the secondary winding 20. In Fig. 5, the phase shifting means takes the form of an inductance 49 connected in series with the motor 11 and the primary winding 19 of the reactor 15. In Fig. 6, a resistance 50 is connected in parallel with the secondary winding 20 of the reactor 15.

While it is desirable for many practical reasons to employ the reactors 14 and 15 of Figs. 1 to 3, 5 and 6 as coupling means between the control circuits and the devices 10 and 11 to be controlled, the employment of reactors is not an essential part of the invention. Indeed the reactors 14 and 15 may be eliminated and the devices 10 and 11 connected directly in the plate circuits of the control circuits. Such a modification is shown in Fig. 7. With this exception, and changes necessitated by this exception, the circuit is the same as that disclosed in Fig. 1, in particular is the basic operation the same.

Suffice it to say, therefore, that the circuit comprises a pair of tubes 12 and 13 of the thyratron type, the tube 12 having an anode or plate 12a, a cathode 12b and a grid 12c, and tube 13 similarly having an anode or plate 13a, a cathode 13b and a grid 13c. A lead 29 is connected to the plate 12a to form one side of the anode circuit of the tube 12, a lead 30 common to both tubes forming the other side. A lead 31 is connected to plate 13a to form the remaining side of the anode circuit of tube 13. The cathodes are indirectly heated in well known manner.

With the tubes assuming a master-slave relationship, only the master tube 12 is directly controlled. This control means includes a switch 16 and means for placing a negative bias on the grid 12c in order to prevent firing of the tube at desired times. The negative bias means comprises a transformer, generally designated 32, having a primary winding 33 connected to line wires W1 and W2 and a secondary winding 34. One terminal of the secondary winding 34 is, through a lead 35, connected to the common or ground lead 30 and thus to the cathode 12b of tube 12. The other terminal of the winding 34 is by a lead 36 connected to the grid 12c and this lead has incorporated therein a condenser 37 and a resistor 55. Switch 16 is connected to the lead 35 and to the lead 36 intermediate the condenser 37 and the tube 12, so as to be capable of rendering the transformer 32 effective or ineffective to place a bias on the grid 12c. The transformer 32 is so connected in circuit that when the switch 16 is open a negative bias is placed on the grid 12c, particularly during the half of the cycle when the plate 12a is positive.

Control of the tube 13, as already stated, is under the tube 12 with the control being such that the tube 13 is firing when the tube 12 is not firing, and vice versa. To that end, there is connected across the anode circuit of the tube 12 a condenser 38 and a resistance 39 connected in series. The value of the condenser is so chosen that its reactance is small compared to the resistance value of the resistance 39, the resistance being on the order of ten times the reactance of the condenser 38. Grid 13c of the tube 13 is by a lead 40 connected to a point intermediate the condenser 38 and the resistance 39. Lead 40 preferably has therein a resistor 56 of the same magnitude as resistor 55.

As above stated, coupling means, such as the reactors 14 and 15 of Fig. 1, are herein eliminated and the devices 10 and 11 connected directly in the plate circuit of the tubes 12 and 13, respectively. With the reactors 14 and 15 not present, the plate voltage for the tube 13 is derived directly from the line wires W1 and W2 through leads 57. Plate voltage for the tube 12 is also derived from the line wires W1 and W2 but through means, generally designated 58, capable of shifting the phase of the voltage. While the means 58 may take a variety of forms, it is for exemplary purposes only here shown as comprising a transformer 59 having a primary winding 60 connected to the line wires W1 and W2 through leads 61 and 62 and a secondary winding 63 connected in the plate circuit. A resistance 64 and a condenser 65 connected in parallel are interposed in the lead 62, and the elements have such values that the plate voltage is advanced with respect to the plate voltage of tube 13. Completing the circuit is a condenser 66 connected plate to plate.

The condenser operates in well known manner to apply an instantaneous negative component of plate voltage to the tube 13 immeditaely after the master tube 12 has fired, thus preventing the tube 13 from breaking down just after the tube 12 has started to conduct.

The operation of that embodiment of the invention shown in Fig. 7 is basically the same as that described for the preferred embodiment and other modifications shown in Figs. 1 to 6, inclusive. Due to the elimination of the reactors 14 and 15, however, there is also eliminated the residual magnetization which is believed to account for the firing of either tube well into the negative half cycle of the plate voltage and the break-down of the tubes at the point B (Fig. 4) slightly in advance of the commencement of the positive half cycle of the plate voltage. As a result, the circuit of Fig. 7 operates successfully to assure that the two tubes do not fire at one and the same time with a somewhat smaller advancement of the non-firing plate voltage of tube 12 over the non-firing plate voltage of tube 13 than is needed where reactors are employed as coupling means, as in Figs. 1 to 6, inclusive. Thus, while the invention is particularly well adapted for assuring proper operation of a control circuit having a master-slave tube arrangement in which the devices to be controlled are coupled to the control circuits through reactors, the invention is equally adaptable for control circuits having a master-slave tube arrangement in which the devices to be controlled are connected directly in the plate circuits of the tubes or are coupled in some manner which does not produce the advance in the time of break-down of a firing tube with respect to its non-firing plate voltage.

It is believed apparent from the foregoing that we have perfected a control circuit adaptable primarily for the control of two devices, one or the other of which is to be operating at all times, but never are the two to operate simultaneously for any material period of time. As stated above, upon closure of the switch 16 during a positive half cycle of the reference voltage, simultaneous firing of both tubes will occur for the balance, but only the balance, of the positive half cycle. The maximum period of simultaneous firing thus is extremely brief and at no time exceeds the time represented by the portion B to A of curve *f* in Fig. 4. Such a period of energization, even with sixty cycle reference voltage, would definitely be too brief to cause operation if the devices 10 and 11 were motors, and would be too brief to initiate operation even of relays or tubes, if the characteristics thereof were properly chosen. Thus for all practical purposes it might be said that the devices 10 and 11 are never operatively energized simultaneously and never operate simultaneously. In particular have we perfected such a control circuit wherein the primary control is effected through a single means while yet assuring proper operation of the control circuit at all times and regardless of the particular point in the operating cycle that the signal for a change in operation is given.

We claim as our invention:

1. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and phase shifting means electrically associated with the anode circuit of one of said tubes and calibrated to provide a non-firing plate voltage for the first tube which at all times leads the non-firing plate voltage of the second tube.

2. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube exercising primary control over the flow of current in the anode circuit of said second tube, and an impedance introducing element in circuit with one of said reactors advancing the non-firing plate voltage of the first tube relative to the non-firing plate voltage of the second tube.

3. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, and means under the control of said first tube for controlling flow of current in the anode circuit of said second tube, the reactor-device portion of the circuit associated with said first tube having a lower inductance to resistance ratio than the reactor-device portion of the circuit associated with said second tube.

4. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance connected in circuit with the reactor associated with said first tube calibrated to cause the plate voltage of said first tube to lead the plate voltage of said second tube near the end of the negative portion of said first tube plate voltage during a cycle following conditioning of the means controlling said first tube to permit firing thereof.

5. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance means connected in circuit with the reactor associated with said second tube calibrated to cause the plate voltage of said second tube to lag the plate voltage of said first tube near the end of the negative portion of said first tube plate voltage during a cycle following conditioning of the means controlling said first tube to permit firing thereof.

6. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance connected in circuit with the first winding of the reactor associated with said first tube calibrated to cause the plate voltage of said first tube to lead the plate voltage of said second tube near the end of the negative portion of said first tube plate voltage during a cycle following conditioning of the means controlling said first tube to permit firing thereof.

7. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance connected in series with the first winding of the reactor associated with said first tube calibrated to cause the plate voltage of said first tube to lead the plate voltage of said second tube near the end of the negative portion of said first tube plate voltage during a cycle following conditioning of the means controlling said first tube to permit firing thereof.

8. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance and the secondary of a boosting transformer connected in series with the first winding of the reactor associated with said first tube calibrated to cause the plate voltage of said first tube to lead the plate voltage of said second tube near the end of the negative portion of said first tube plate voltage during a cycle following conditioning of the means controlling said first tube to permit firing thereof.

9. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and a capacitance connected in parallel with the first winding of the reactor associated with said first tube calibrated to cause the plate voltage of said first tube to lead the plate voltage of said second tube near the end of the negative portion of said first tube plate voltage during a cycle following conditioning of the means controlling said first tube to permit firing thereof.

10. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance means connected in circuit with the first winding of the reactor associated with said second tube calibrated to cause the plate voltage of said second tube to lag the plate voltage of said first tube near the end of the negative portion of said first tube plate voltage during a cycle following conditioning of the means controlling said first tube to permit firing thereof.

11. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and an inductance connected in series with the first winding of the reactor associated with said second tube calibrated to cause the plate voltage of said second tube to lag the plate voltage of said first tube near the end of the negative portion of said first tube plate voltage during a cycle following conditioning of the means controlling said first tube to permit firing thereof.

12. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance connected in parallel with the second winding of the reactor associated with said second tube calibrated to cause the plate voltage of said second tube to lag the plate voltage of said first tube near the end of the negative portion of said first tube plate voltage during a cycle following conditioning of the means controlling said first tube to permit firing thereof.

13. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, grid control means subject only to the voltage changes across the winding in the anode circuit of said first tube governing the bias on the grid of said second tube to permit firing thereof whenever said first tube is not firing and arrest firing whenever said first tube is firing, and an impedance introducing element in circuit with one of said reactors advancing the non-firing plate voltage of said first tube relative to the non-firing plate voltage of said second tube to render said grid control means effective to arrest firing of said second tube upon firing of said first tube.

14. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance introducing element connected in circuit with the reactor associated with said first tube calibrated to cause the plate voltage of said first tube to lead the plate voltage of said second tube near the end of a cycle not later than the cycle following the cycle in which conditioning of the means controlling said first tube to permit firing thereof took place.

15. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and an impedance means connected in circuit with the reactor associated with said second tube calibrated to cause the plate voltage of said second tube to lag the plate voltage of said first tube near the end of a cycle not later than the cycle following the cycle in which conditioning of the means controlling said first tube to permit firing thereof took place.

16. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance connected in series with the first winding of the reactor associated with said first tube.

17. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance and the secondary of a boosting transformer connected in series with the first winding of the reactor associated with said first tube.

18. A circuit for controlling the operation of a pair of electrical devices comprising a first and a second electric-valve tube each having an anode, a cathode and a grid, an anode circuit and a grid circuit for each tube, a pair of reactors each having a first winding adapted to be connected to a source of alternating current and in circuit with one of the devices and a second winding connected in the anode circuit of one of said tubes, the first winding of each of said reactors having a normal relatively high impedance when no unidirectional current is flowing in the second winding and a sufficiently lowered impedance when unidirectional current is flowing in the second winding thereby to govern operation of the device with which the reactor is associated, means for controlling the flow of current through said first tube, means under the control of said first tube for controlling flow of current in the anode circuit of said second tube, and a capacitance connected in parallel with the first winding of the reactor associated with said first tube.

19. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and an inductance connected in series with the first winding of the reactor associated with said second tube.

20. A circuit for controlling the operation of a pair of electrical devices comprising a first and a second electric-valve tube each having an anode, a cathode and a grid, an anode circuit and a grid circuit for each tube, a first and a second reactor each having a first winding adapted to be connected in series with a source of alternating current and one of the devices and having sufficient impedance normally to prevent the flow of an operating current through the device and a second winding each connected in the anode circuit of one of said tubes, means for controlling the flow of current through said first tube, means under the control of said first tube for controlling flow of current in the anode circuit of said second tube, and a resistance connected in parallel with the second winding of the reactor associated with the second tube.

21. A circuit for controlling the operation of a pair of electrical devices comprising a first and a second electric-valve tube each of the thyratron type and having an anode, a cathode and a grid, an anode circuit for each of said tubes each having one of the devices electrically associated therewith for control by the respective tube and being adapted for connection to a source of anode potential, means for controlling the flow of current through said first tube, means under the control of said first tube for controlling flow of current in the anode circuit of said second tube, and an impedance introducing element in the anode circuit of one of said tubes advancing the non-firing plate voltage for the first tube relative to the non-firing plate voltage of the second tube.

22. A circuit for controlling the operation of a pair of electrical devices comprising a first and a second electric-valve tube each of the thyratron type and having an anode, a cathode and a grid, an anode circuit for each of said tubes each having one of the devices electrically associated therewith for control by the respective tube and being adapted for connection to a source of anode potential, means for controlling the flow of current through said first tube, grid control means subject to the anode voltage changes of only said first tube governing the bias on the grid of said second tube to permit firing thereof whenever said first tube is not firing and to arrest firing whenever said first tube is firing, and phase shifting means electrically associated with the anode circuit of one of said tubes and calibrated to cause the anode voltage of said first tube to lead the anode voltage of said second tube to render said grid control means effective to arrest firing of said second tube upon firing of said first tube.

23. A circuit for controlling the operation of a pair of electrical devices comprising a first and a second electric-valve tube each of the thyratron type and having an anode, a cathode and a grid, an anode circuit for each of said tubes each having one of the devices electrically associated therewith for control by the respective tube and being adapted for connection to an alternating current source of anode potential, means for controlling the flow of current through said first tube, means under the control of said first tube for controlling flow of current in the anode circuit of said second tube, and an impedance electrically associated with the circuit of one of said tubes operating to cause the anode voltage of said first tube to lead the anode voltage of said second tube near the end of the negative portion of said first tube anode voltage during a cycle following conditioning of the means controlling said first tube to permit firing thereof.

24. A circuit for controlling the operation of a pair of electrical devices comprising a first and a second electric-valve tube each of the thyratron type and having an anode, a cathode and a grid, an anode circuit for each of said tubes each having one of the devices electrically associated therewith for control by the respective tube and being adapted for connection to a source of anode potential, means for controlling the flow of current through said first tube, means under the control of said first tube functioning upon break-down of said first tube to prevent break-down of said second tube, and impedance introducing means electrically associated with the anode circuit of one of said tubes delaying the time of possible break-down of said second tube until the means under the control of said first tube can make itself felt.

PAUL GLASS.
FRANK E. PREM.

REFERENCES CITED

The following references are of record in the file of this patent:

UNITED STATES PATENTS

| Number | Name | Date |
|---|---|---|
| 1,937,369 | Willis | Nov. 28, 1933 |
| 2,208,235 | Whitenack | July 16, 1940 |
| 2,231,570 | Ryder | Feb. 11, 1941 |
| 2,346,838 | Haight | Apr. 18, 1944 |
| 2,348,862 | Sorkin | May 16, 1944 |
| 2,352,953 | Haight | July 4, 1944 |